(12) United States Patent
Stuckey

(10) Patent No.: US 8,528,679 B2
(45) Date of Patent: Sep. 10, 2013

(54) AIR SEPARATING INTAKE SCOOP FOR AIR INTAKE SYSTEM

(75) Inventor: Joshua D. Stuckey, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 12/942,266

(22) Filed: Nov. 9, 2010

(65) Prior Publication Data
US 2012/0111653 A1 May 10, 2012

(51) Int. Cl.
*B60K 13/02* (2006.01)

(52) U.S. Cl.
CPC ...................................... *B60K 13/02* (2013.01)
USPC ........................................................ 180/68.3

(58) Field of Classification Search
USPC ............................... 180/68.1, 68.2, 68.3, 69.1
See application file for complete search history.

(56) References Cited

U.S. PATENT DOCUMENTS

| | | | |
|---|---|---|---|
| 4,420,057 A | 12/1983 | Omote et al. | |
| 5,251,712 A * | 10/1993 | Hayashi et al. | 180/68.3 |
| 5,564,513 A * | 10/1996 | Wible et al. | 180/68.3 |
| 6,698,539 B2 * | 3/2004 | Decuir | 180/68.3 |
| 6,880,655 B2 | 4/2005 | Suwa et al. | |
| 7,059,439 B2 * | 6/2006 | Storz et al. | 180/68.1 |
| 7,234,555 B2 * | 6/2007 | Khouw et al. | 180/68.3 |
| 7,237,635 B2 | 7/2007 | Khouw et al. | |
| 7,290,630 B2 | 11/2007 | Maeda et al. | |
| 7,717,204 B2 | 5/2010 | Kondou et al. | |
| 8,127,878 B2 * | 3/2012 | Teraguchi et al. | 180/68.3 |
| 2005/0230162 A1 | 10/2005 | Murayama et al. | |
| 2010/0032220 A1 * | 2/2010 | Ohira et al. | 180/68.3 |
| 2010/0038161 A1 | 2/2010 | Laakso | |

* cited by examiner

*Primary Examiner* — John R Olszewski
*Assistant Examiner* — Brian Cassidy
(74) *Attorney, Agent, or Firm* — Rankin, Hill & Clark LLP

(57) ABSTRACT

An air intake system for a vehicle includes a grille disposed at a forward end of the vehicle for admitting airflow into an engine compartment of the vehicle and a scoop having a ramped surface for directing at least a portion of the airflow admitted through the grille upward toward an air intake of the vehicle. The ramped surface has an aperture defined therein for removing entrained particles from the portion of the airflow directed upward by the ramped surface.

18 Claims, 3 Drawing Sheets

AIR SEPARATING INTAKE SCOOP FOR AIR INTAKE SYSTEM

BACKGROUND

The present disclosure generally relates to vehicle air intake systems, and more particularly relates to an air separating intake scoop for an air intake system on a vehicle.

Air intake systems provide necessary air to internal combustion engines to aid in the combustion process. Conventional intake systems either draw air from inside the engine compartment or they draw air from outside the vehicle via an exterior intake port. Systems designed where the air is drawn from the inside of the engine compartment commonly suffer a drawback of drawing in warmer and less dense air than exterior air. This can reduce the efficiency of the engine compared with the use of cooler exterior air. A solution to address the shortcoming of these systems is to draw in cooler exterior air.

In particular, it is advantageous to fuel economy and torque to have cold air going into the engine's air intake as opposed to hot air from around the engine in the engine compartment. Often for this reason, numerous systems have been used to get cold air from outside the vehicle while blocking the hot air from the engine room. One such system employs an air scoop to direct fresh air toward the engine's air intake system. Unfortunately, a problem associated with known air intake scoops is that water or particles (e.g., snow) can be directed to the engine's intake by the scoop along with fresh air. This can result in numerous problems, such as blockage the engine intake, inhibition of airflow and/or damage to the engine.

SUMMARY

According to one aspect, an air intake system for a vehicle includes a grille disposed at a forward end of the vehicle for admitting airflow into an engine compartment of the vehicle and a scoop having a ramped surface for directing at least a portion of the airflow admitted through the grille upward toward an air intake of the vehicle. The ramped surface has an aperture defined therein for removing entrained particles from the portion of the airflow directed upward by the ramped surface.

According to another aspect, an air separating intake scoop disposed behind a grille on a vehicle includes a ramped surface for directing at least a portion of the airflow admitted through the grille upward toward an air intake inlet port of the vehicle. The air separating intake scoop further includes an aperture defined in the ramped surface that removes entrained particles from the portion of the airflow directed upward by the ramped surface so the removed particles are prevented from entering the air intake inlet port.

According to a further aspect, an air intake scoop includes a ramped wall for directing incoming air flow upwardly toward an engine intake and an aperture defined through the ramped wall for capturing particles entrained in the incoming airflow and preventing the particles from entering the engine intake.

DETAILED DESCRIPTION

Figure 1:
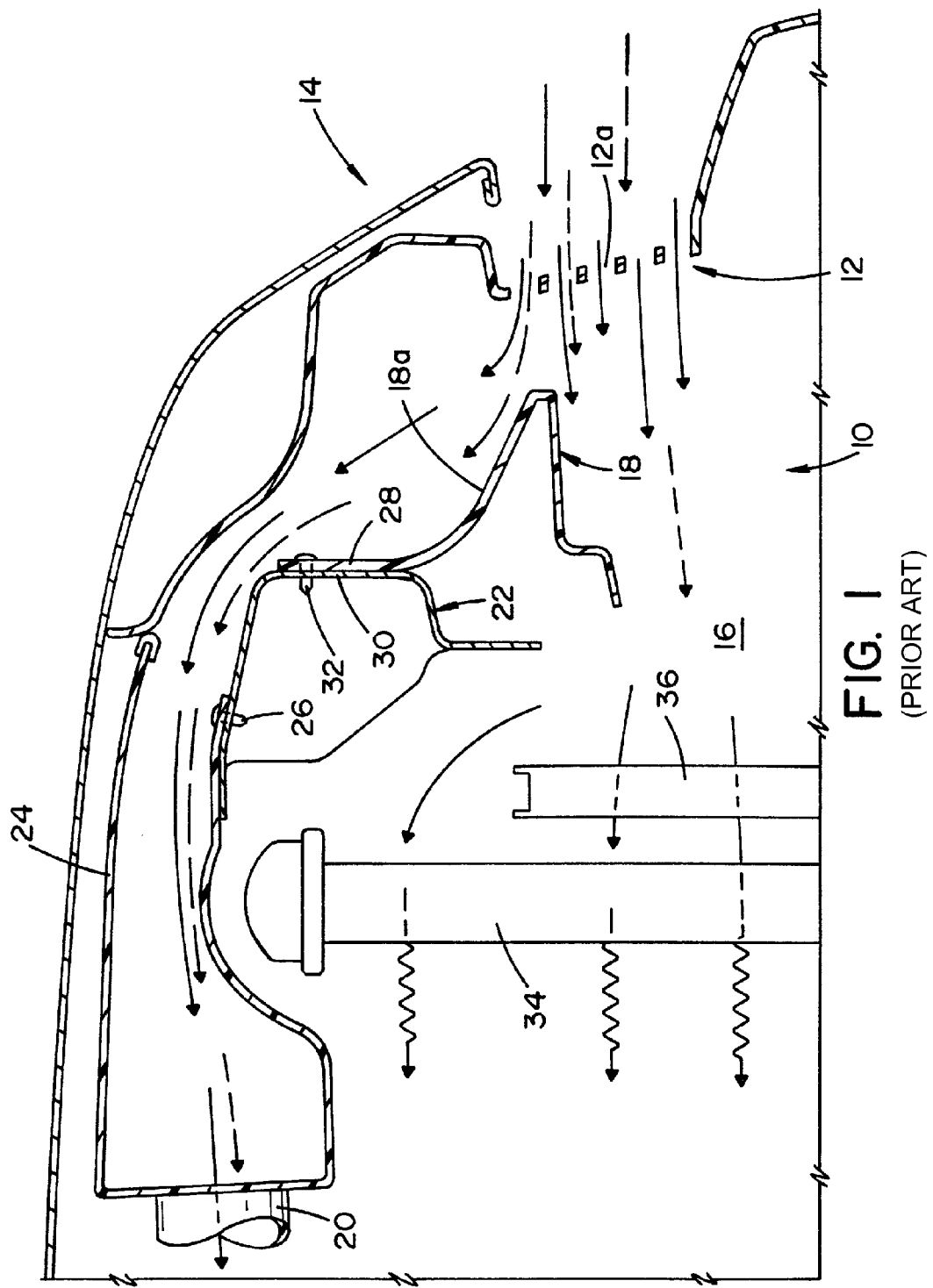
FIG. 1 is a sectional view of a known vehicle air intake system.

Referring now to the drawings, wherein the showings are for purposes of illustrating one or more exemplary embodiments and not for purposes of limiting same, FIG. 1 illustrates a known vehicle air intake system for a vehicle, the system generally designated by reference 10. As shown, the system 10 includes a front facia or grille 12 disposed at a forward end 14 of a vehicle for admitting airflow into an engine compartment 16 of the vehicle. The system 10 further includes a scoop 18 for directing at least a portion of the airflow admitted through the grill 12, and particularly through grille openings 12a, upward toward an air intake 20 of the vehicle.

In the illustrated embodiment, the air intake 20 is disposed over a bulkhead 22 that extends laterally across the engine compartment 16. The scoop 18 includes a ramped surface 18a for directing at least a portion of the airflow admitted through the grille openings 12a upward over the bulkhead 22 toward the intake 20. The system 10 further includes an intake enclosure 24 for guiding the upwardly directed air (i.e., upwardly directed by the scoop 18) from the scoop 18 to the intake 20. As will be described in more detail below, the intake enclosure 24 can be secured to the bulkhead 22.

In particular, the bulkhead 22 can be a transverse frame element disposed across a front of the engine compartment 16. The bulkhead 22 is generally a structural frame member that traverses a front region of the engine compartment 16 along a top region of the compartment 16. The air intake enclosure 24 is primarily disposed above the bulkhead 22 and can be attached directly to the bulkhead 22 via fastener 26, to a bulkhead cover (not shown) and/or to other structures via hardware such as bolts and/or other common connectors or fasteners (e.g., illustrated fastener 26). As is known and understood by those skilled in the art, the air intake enclosure 24 provides an air passageway to the air intake 20, which itself provides an air passageway to an air filter unit (not shown) for further channeling filtered air to the vehicle's engine (not shown).

The scoop 18 can include a vertically oriented mounting wall 28 which is directly mounted to a corresponding vertical surface 30 of the bulkhead 22 via a suitable fastener 32. In addition to guiding air over the bulkhead 22, the scoop 18 and the intake enclosure 24 can guide the portion of upwardly directed airflow over a radiator 34. In the illustrated embodiment, the radiator 34 is disposed in longitudinally spaced relation behind the grille 12 and positioned longitudinally rearward of the bulkhead 22. As is known and understood by those skilled in the art, a condenser 36 can be longitudinally interposed between the radiator 34 and the grille 22, and particularly between the radiator 34 and the bulkhead 22 in the illustrated embodiment. The airflow that is not upwardly directed by the scoop 18 can continue on its longitudinally rearwardly directed path from the grille 12 to the condenser 36 and radiator 34.

A drawback of the system 10 illustrated in FIG. 1 is that snow, water, moisture and/or other particles can be entrained in the airflow admitted through the openings 12a of the grille 12. These entrained particles can remain in the portion of the airflow upwardly directed by the scoop 18 and therefore, can be passed by the intake enclosure 24 to the intake 20. This can result in blockage of the engine intake 20, inhibition of airflow and/or damage to the engine.

Figure 2:
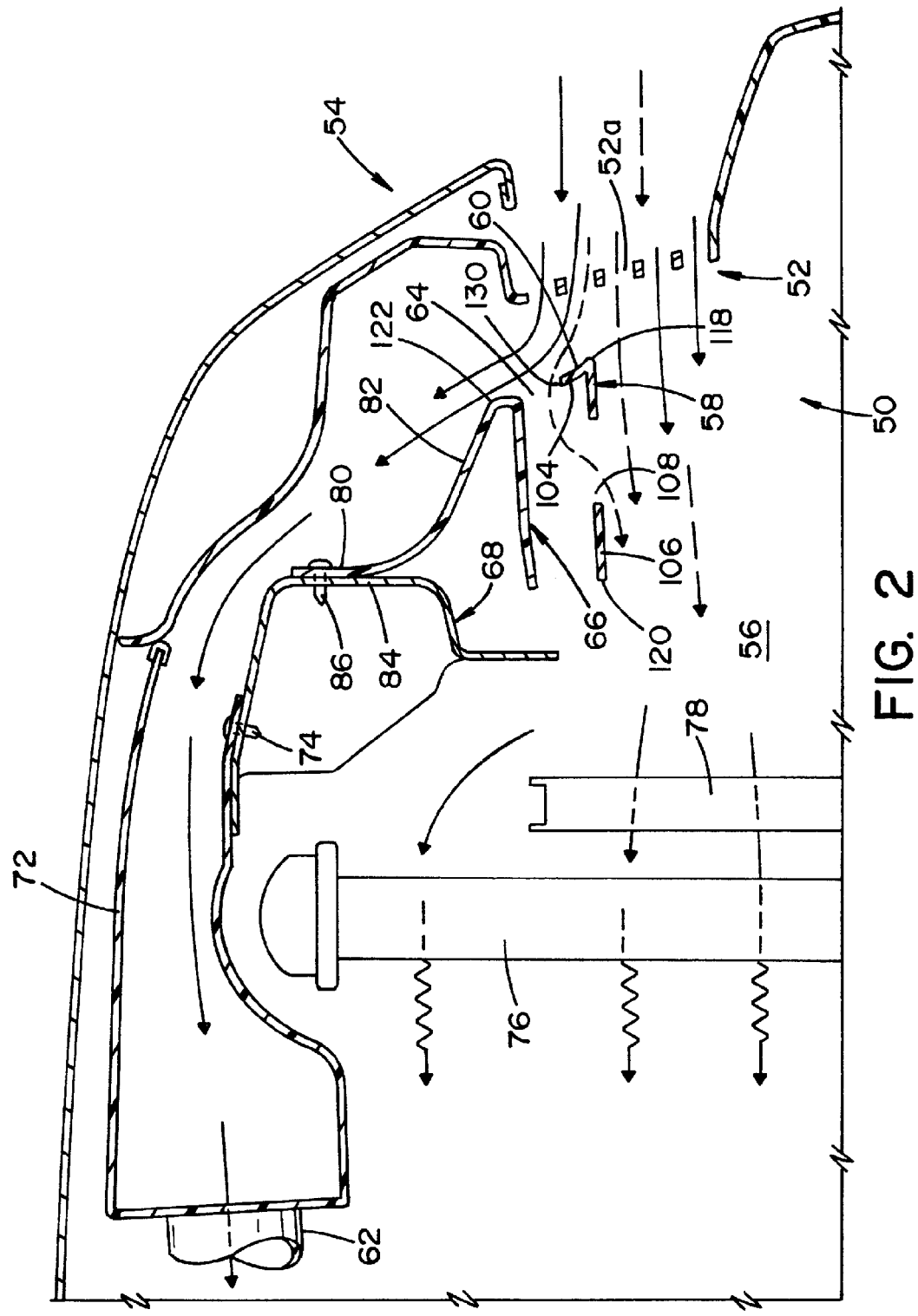
FIG. 2 is a sectional view similar to FIG. 1, but of another vehicle air intake system having an air separating intake scoop.
Figure 3:
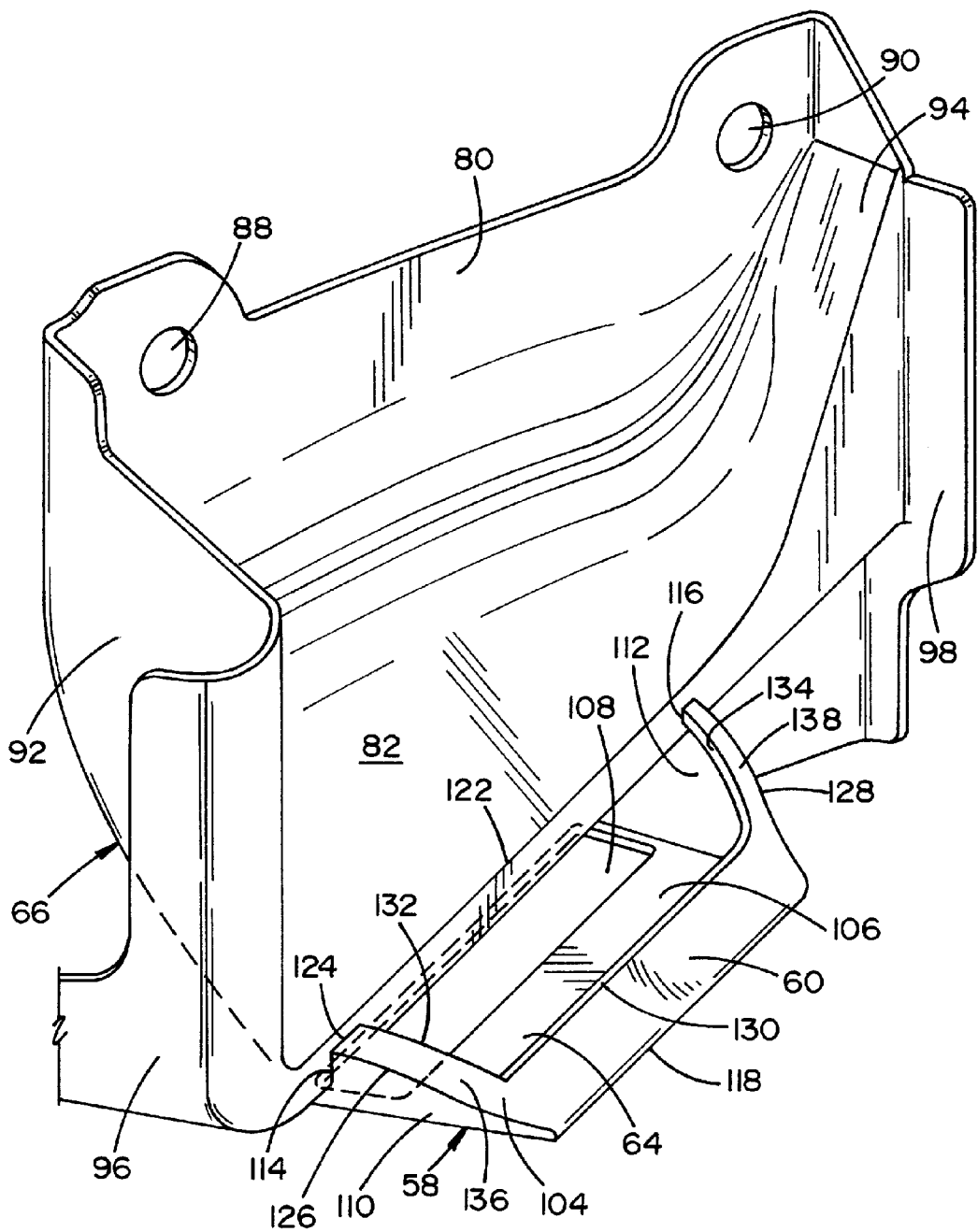
FIG. 3 is a perspective view of the air separating intake scoop shown attached to a primary scoop of the air intake system of FIG. 2, both shown in isolation from the air intake system.

With reference to FIGS. 2 and 3, another air intake system for a vehicle is shown according to an alternate embodiment and is generally designated by reference 50. Like the system 10, the system 50 can include a front facia or grille 52 disposed at a forward end 54 of a vehicle with the grille 52 having one or more grille openings or inlet apertures 52a for admitting airflow into an engine compartment 56 of the vehicle. The system 50 can further include an air separating intake scoop 58 disposed behind the grille 52 on the vehicle. The scoop 58 can have a ramped surface 60 for directing at least a portion of the airflow admitted through the grille 52 upward toward an air intake inlet port or air intake 62.

As will be described in more detail below, the ramped surface 60 has an aperture 64 defined therein for removing entrained particles from the portion of the airflow directed upward by the ramped surface 60. The entrained particles are removed so that they are prevented from entering the air intake 62. In the illustrated embodiment, the scoop 58 is a secondary scoop and the air intake system 10 further includes a primary scoop 66 secured to a bulkhead 68 extending across the engine compartment 56. As shown, the secondary scoop 58 can extend from a front lower portion of the primary scoop 66.

The illustrated air intake 62 is disposed over the bulkhead 68, which itself extends laterally across the engine compartment 56. The system 50 further includes an intake enclosure 72 for guiding the upwardly directed air (i.e., upwardly directed by the scoops 58, 66) to the intake 62. As shown, the intake enclosure 72 can be secured to the bulkhead 68. Like the bulkhead 22, the bulkhead 68 can be a transverse frame element disposed across a front of the engine compartment 56. The bulkhead 68 is generally a structural frame member that traverses a front region of the engine compartment 56 along a top region of the compartment 56. The air intake enclosure 72 is primarily disposed above the bulkhead 56 and can be attached directly to the bulkhead 56 via fastener 74, to a bulkhead cover (not shown) and/or to other structures via hardware such as bolts and/or other common connectors or fasteners (e.g., illustrated fastener 74). Like the intake enclosure 24, the air intake enclosure 72 provides an air passageway to the air intake 62, which itself provides an air passageway to an air filter unit (not shown) for further channeling filtered air to the vehicle's engine (not shown).

In addition to guiding air over the bulkhead 68, the scoops 58, 66 and the intake enclosure 72 can guide the portion of upwardly directed airflow over a radiator 76. In the illustrated embodiment; the radiator 76 is disposed in longitudinally spaced relation behind the grille 52 and positioned longitudinally rearward of the bulkhead 68. As is known and understood by those skilled in the art, a condenser 78 can be longitudinally interposed between the radiator 76 and the grille 52, and particularly between the radiator 76 and the bulkhead 68 in the illustrated embodiment. The airflow that is not upwardly directed by the scoops 58, 66 can continue on its longitudinally rearwardly directed path from the grille 52 to the condenser 78 and radiator 76. The secondary scoop 58 is interposed between the grille 52 and the radiator 76, and is configured to direct the portion of the airflow upward over the radiator to the air intake 62.

As shown, the primary scoop 66 includes a vertically oriented mounting wall 80 and a ramped surface 82 blending into the generally vertically oriented mounting wall 80. The mounting wall 80 can be secured to a generally vertically oriented surface or wall 84 of the bulkhead 68 via a suitable fastener 86. In particular, the mounting wall 80 can include mounting apertures 88, 90 through which fasteners 86 are received for securing the primary scoop 66 to the bulkhead 68. With specific reference to FIG. 3, the primary scoop 66 can further include side walls 92, 94 extending forward from the mounting wall 80 and flanking the ramped surface 82. As shown, the side walls 92, 94 may not be symmetrical and can be advantageously configured to best direct the portion of the airflow to the engine intake 62 taking into account any laterally offset mounting of the primary scoop 66 and the intake 62 within the engine compartment 56. Flanged portions 96, 98 can extend from the sidewalls 92, 94, respectively, for improved capturing of the portion of the airflow to be directed upwardly to the air intake 62 and/or for further securing or mounting of the primary scoop 66 within the engine compartment 56.

The secondary scoop 58 includes a ramped wall 104 having an upper side defining the ramped surface 60, and a base wall 106 oriented as an acute angle relative to the ramped wall 104. As shown, the ramped wall 106 of the illustrated embodiment can define a second aperture 108 therethrough for the particles removed from the portion of the airflow directed upward by the ramped surface 60. Together the apertures 64, 108 direct particles removed from the portion of the airflow toward the radiator 76 disposed longitudinally rearward of the ramped surface 60 instead of being otherwise upwardly directed by the ramped surface 60.

The secondary scoop 58 can further include side walls 110, 112 connecting the ramped wall 104 and the base wall 106. The side walls 110, 112 of the illustrated embodiment define notches 114, 116 that accommodate or receive the primary scoop 66. The secondary scoop 58 can be molded as a single piece together with the primary scoop 66. Alternatively, in an alternate embodiment, the secondary scoop 58 could be separately formed and then mounted to the primary scoop 66 by any conventional means, including suitable fasteners, adhesives, etc.

As shown, the base wall 106 can have a forward edge 118 that is disposed forward of the primary scoop 66 and a rearward edge 120 disposed rearwardly of a leading edge 122 of the primary scoop 66. The rearward edge 120 of the base wall 106 can be approximately aligned longitudinally with the mounting wall 80 of the primary scoop 66. The ramped wall 104 can have a forward edge that is the same forward edge 118 as the base wall 106. The ramped wall 104 an further include a rearward edge 124 and side edges 126, 128. The aperture 64 through the ramped wall 104 can be formed as a recess (as shown in the illustrated embodiment) into the ramped wall 104 from the rearward edge 124. Additionally, and as shown in the illustrated embodiment, the aperture 64 can extend longitudinally from the rearward edge 124 of the ramped wall 104 to a forward aperture edge 130.

In particular, the aperture 64 can extend longitudinally from the rearward edge 124 of the ramped wall 104 to the forward aperture edge 130 of the ramped wall 104 that is disposed in closer relation to the forward edge 118 of the ramped wall 104 than the rearward edge 124 of the ramped wall 104. The aperture 64 can further be formed by side aperture edges 132, 134 of the ramped wall 104 that are substantially parallel to side edges 126, 128 of the ramped wall 104. The side aperture edges 132, 134 can be disposed in close adjacent relation to the side edges 126, 128 of the ramped wall 104. For example, as shown, only a narrow strip 136, 138 of the ramped wall 104 or ramped surface 60 can be disposed between the edges 126, 128 and the side aperture edges 132, 134. For example, in the illustrated embodiment, each of the strips 136, 138 can be less than 10 percent of an overall width of the ramped wall 104.

Advantageously, the secondary scoop 58 can separate the upwardly directed air from incoming particles (e.g., water and snow) and thus, can allow mostly fresh air to enter the engine intake 62 and reduce the amount of water and snow reaching the engine intake 62. The secondary scoop 58 can serve as a "floating" scoop where various particles (e.g., water and snow) can be separated from the upwardly directed air by utilizing the differences in mass between the upwardly directed air and the incoming entrained particles. In contrast, the intake system 10 accepts anything that comes through the grille and is directed upward to the engine's air intake. Accordingly, the secondary scoop 58 can reduce problems that are associated with water and snow being taken into the engine's intake. Additionally, the system 50 can potentially increase the life of the filter element of the engine's intake filter by removing some of the dust particles that enter through the grille.

Operationally, the secondary scoop 58 is effective due to the fact that entrained particles in the incoming airflow, such as water and snow particles, have more inertia than the incoming air itself. Accordingly, as the incoming particles pass over the ramped surface 60 of the secondary scoop 58, the air is directed upward while the inertia of the entrained particles carry them through the apertures 64, 108 in the secondary scoop 58 thereby separating them from the upwardly directed airflow. Additionally, the effect of gravity on the particles helps separate them from the upwardly directed airflow due in at least in part to the advanced shape of the secondary scoop 58.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air intake system in a vehicle, comprising:
   a grille disposed at a forward end of the vehicle for admitting airflow into an engine compartment of the vehicle;
   a secondary scoop having a ramped surface facing upward with a lower end disposed more forwardly relative to a forward direction of travel of the vehicle than an upper end thereof for directing at least a portion of the airflow admitted through the grille upward toward an air intake of the vehicle, the ramped surface having an aperture defined therein that receives an entrained particle airflow portion from the portion of the airflow directed upward by the ramped surface and directs the entrained particle airflow portion away from the air intake so as to prevent entrained particles contained within the entrained particle airflow portion from reaching the air intake; and
   a primary scoop secured to a bulkhead extending across the engine compartment and having a primary scoop ramped surface facing upward that further directs the at least a portion of the airflow upward toward the air intake, the secondary scoop extending forward from a front lower portion of the primary scoop.

2. The air intake system of claim 1 wherein the primary scoop includes:
   a generally vertically oriented mounting wall; and
   a ramped surface blending into the generally vertically oriented mounting wall.

3. The air intake system of claim 2 wherein the primary scoop further includes:
   sidewalls extending forward from the mounting wall and flanking the ramped surface.

4. The air intake system of claim 1 wherein the secondary scoop includes a ramped wall having an upper side defining the ramped surface and a base wall oriented at an acute angle relative to the ramped wall.

5. The air intake system of claim 4 wherein the base wall defines a second aperture therethrough for the particles removed from the portion of the airflow directed upward.

6. The air intake system of claim 5 wherein the secondary scoop further includes sidewalls connecting the ramped wall and the base wall.

7. The air intake system of claim 6 wherein the sidewalls define notches that receive the primary scoop.

8. The air intake system of claim 4 wherein the base wall has a forward edge disposed forwardly relative to a direction of travel of the vehicle of the primary scoop and a rearward edge disposed rearwardly relative to a direction of travel of the vehicle of a leading edge of the primary scoop.

9. The air intake system of claim 8 wherein the rearward edge of the base wall is approximately aligned longitudinally with a mounting wall of the primary scoop, the mounting wall secured to a generally vertically oriented surface of a bulkhead extending across the engine compartment.

10. The air intake system of claim 1, further including:
    a radiator disposed in longitudinally spaced relation behind the grille, the primary and secondary scoops interposed between the grille and the radiator and configured to direct the portion of the airflow upward over the radiator to the air intake.

11. The air intake system of claim 2 wherein the ramped surface is formed by a ramped wall of the scoop, the ramped wall having a forward edge, a rearward edge and side edges, the aperture formed as a recess into the ramped wall from the rearward edge.

12. The air intake system of claim 11 wherein the aperture extends longitudinally from the rearward edge of the ramped wall to a forward aperture edge of the ramped wall that is disposed in closer relation to the forward edge of the ramped wall than the rearward edge of the ramped wall.

13. The air intake system of claim 12 wherein the aperture is further formed by side aperture edges of the ramped wall that are substantially parallel to the side edges of the ramped wall.

14. The air intake system of claim 13 wherein the side aperture edges are disposed in close adjacent relation to the side edges of the ramped wall.

15. The air intake system of claim 1 wherein the ramped surface of the secondary scoop is vertically aligned with the grille.

16. An air separating intake scoop disposed behind a grille on a vehicle, comprising:
    a ramped surface upwardly directing at least a portion of the airflow admitted through the grille upward toward an air intake inlet port of the vehicle; and
    an aperture defined in the ramped surface that removes entrained particles from the portion of the airflow directed upward by the ramped surface so the removed particles are prevented from entering the air intake inlet port;
    a ramped wall having an upper side forming the ramped surface;
    a base wall disposed directly below the ramped wall and angled acutely relative to the ramped wall to form a V-shape between the ramped wall and the base wall with the apex of the V-shape forming a leading edge for the ramped surface; and
    a second aperture defined in the base wall spaced vertically below the aperture defined in the ramped surface for directing particles removed from the portion of the airflow toward a radiator disposed longitudinally rearward of the ramped surface.

17. The air separating intake scoop of claim 16 further including:
sidewalls connecting the base wall and the ramped wall, the sidewalls having notches respectively defined therein for accommodating a primary scoop from which the intake scoop extends.

18. The air separating intake scoop of claim 16 wherein the ramped surface is disposed between the grille and a radiator disposed longitudinally rearward of the grille, the air intake inlet port disposed over and forward of the radiator.

\* \* \* \* \*